Oct. 20, 1925.  
L. P. CROSS  
1,557,663  
VEHICLE BODY STABILIZER AND EQUILIBRIUM DEVICE  
Filed July 16, 1924
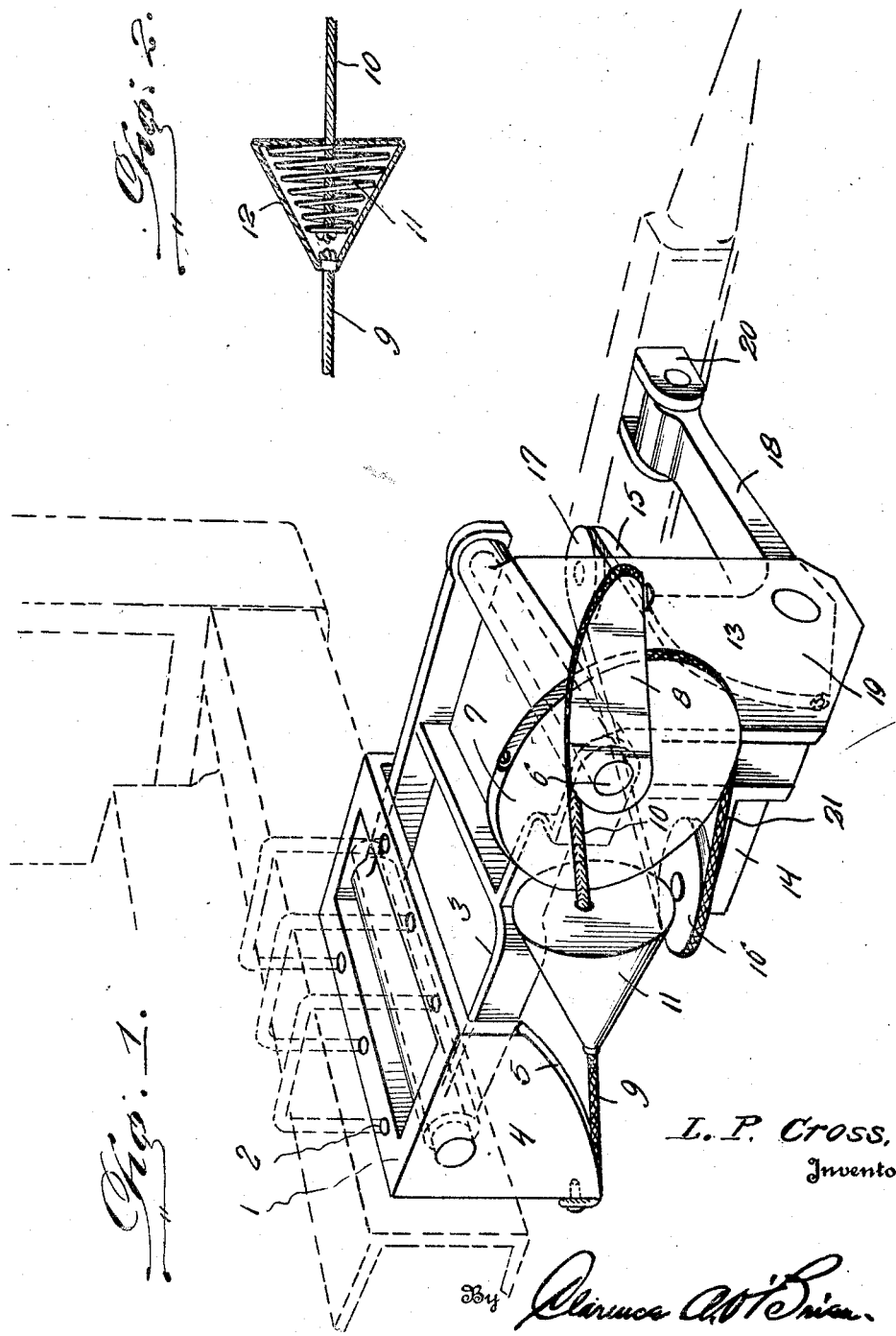

Patented Oct. 20, 1925.

1,557,663

UNITED STATES PATENT OFFICE.

LAWRENCE P. CROSS, OF GARY, INDIANA, ASSIGNOR OF ONE-FIFTH TO HENRY B. COLBURN, ONE-FIFTH TO BERNARD T. SAYLES, ONE-FIFTH TO EDWIN W. SALES, AND ONE-FIFTH TO CARL E. VALETTE, ALL OF GARY, INDIANA.

VEHICLE BODY STABILIZER AND EQUILIBRIUM DEVICE.

Application filed July 16, 1924. Serial No. 726,311.

*To all whom it may concern:*

Be it known that I, LAWRENCE P. CROSS, a citizen of the United States, residing at Gary, in the county of Lake and State of Indiana, have invented certain new and useful Improvements in a Vehicle Body Stabilizer and Equilibrium Device, of which the following is a specification.

This invention relates to stabilizing or equilibrium devices adapted to be applied to the body and axle of an automobile machine or other vehicle, and it consists in the novel features hereinafter described and claimed.

An object of the invention is to provide a stabilizing mechanism of simple and durable structural arrangement and which when applied will serve to prevent the body of an automobile machine from rocking laterally.

With this object in view the device comprises a bracket adapted to be applied to the body and having a frame pivotally connected therewith. A shaft is journaled upon the frame and is provided with a crank arm, cable sections are connected with the crank arm and the brackets respectively and the inner end portions of the cable sections are connected together by a spring device whereby the frame is normally held at an elevated position. A hanger is pivoted upon the shaft and an arm is pivoted in the hanger and is pivotally connected with the axle of the automobile machine. A wheel is mounted upon the shaft and the cable is connected at one end with the periphery of the wheel and its intermediate portion is trained around the pulleys mounted upon the hanger and the other end of this last mentioned cable is connected with the arm.

In the accompanying drawing:—

Figure 1 is a perspective view of the stabilizing device.

Figure 2 is a detailed sectional view of the spring means used for connecting the ends of the cable sections of the stabilizing device together.

As illustrated in the accompanying drawing, the stabilizing device comprises a bracket 1 provided at its top side with openings 2 through which bolts may be passed for the purpose of securing the said bracket to the frame of the automobile machine in the vicinity of the forward end thereof. A frame 3 is pivotally mounted in the bracket 1 and the bracket is provided at one end with a flange 4 having a curved and grooved lower edge 5. A shaft 6 is journaled in the outer end of the frame 3 and carries a grooved pulley wheel 7 and an arm 8. Cable sections 9 and 10 are connected at their ends with the flange 4 and the arm 8 respectively and the cable section 9 is connected with a cone shaped housing 11 through the end of which the cable 10 passes. A cone shaped coil spring 12 is housed within the casing 11 and one end thereof is connected with the cable 10 and the other end bears against the end of the said cable. The spring 12 is under tension with a tendency to hold the end of the cable 10 toward the adjacent end of the cable 9. A hanger 13 is pivotally mounted upon the shaft 6 between the sides of the frame 3 and is provided with the lugs 14 and 15 upon which grooved pulleys 16 and 17 are journaled. An arm 18 is pivotally mounted in the lower portion of the hanger 13 and is provided at its inner end with an arcuate section 19. The end of the arm 18 is pivotally connected with the clip 20 which is adapted to be secured to the side of the axle of the automobile machine and in the vicinity of the spindle thereof as shown in Figure 1 of the drawing. A cable 21 is connected at one end with the arcuate portion 19 of the arm 18 and at its other end the said cable is attached to the periphery of the wheel 7. The intermediate portions of the cable 21 are trained around the pulleys 16 and 17.

Therefore it will be seen that when the body of the automobile machine tends to rock with relation to the axle or should the axle swing vertically with relation to the body, the arm 18 is swung with relation to the axle whereby the cable 21 is moved about the pulleys 16 and 17 and the wheel 7 is turned whereby the arm 8 is swung about the axis of the shaft 6 and the spring 12 is compressed within the housing 11. The stabilizing devices are applied one at each side of the body of the automobile machine and consequently the devices cooperate with each other and serve to prevent the body of the automobile machine from rocking with relation to the axles.

Having thus described the invention, what I claim is:—

1. A stabilizing device of the class described comprising a bracket, a frame pivoted upon the bracket, a shaft journaled for rotation upon said frame, said shaft having a crank arm and a pulley at one end thereof, a hanger depending from said frame, an arm pivoted at one end to said hanger and adapted to be pivotally connected at its opposite end to the axle of a vehicle, additional pulleys journaled for rotation upon said hanger, a cable connected at one end with said first named pulley and connected at its opposite end with the second named arm, and having its intermediate portions trained around said additional pulleys, and a sectional cable, the outer ends of the sections of which are connected to said bracket and crank arm respectively, and spring means with which the inner ends of said cable sections are associated.

2. A stabilizing device of the class described comprising a frame, means for pivotally mounting the frame upon the body of a vehicle, a shaft journaled for rotation upon said frame, a pulley rigidly connected at one end of said shaft, a crank arm also connected to said one end of the shaft, supplemental pulleys supported beneath said frame, an arm adapted to be pivotally connected at one end to the axle of the vehicle and pivotally connected at its opposite end to said frame, a cable connected at one end to said first-named pulley, at its opposite end to said pivoted arm, and having its intermediate portion trained over said supplemental pulley, and spring means for resisting the rotation of said first named pulley and crank arm in one direction.

3. A stabilizing device of the class described, comprising a horizontally disposed frame adapted to be pivotally connected at one end to the body of a vehicle, a vertically disposed pulley mounted for rotation upon said frame, a crank arm rotatable with said pulley, supplemental horizontally disposed pulleys supported for rotation beneath said frame, an arm adapted to be pivotally connected at one end to the axle of the vehicle, and having pivotal connection, at its opposite end with said frame, a cable connected at one end to said vertical pulley, connected at its opposite end to said pivoted arm, and having its intermediate portion trained over said supplemental pulleys, and spring means for resisting the rotation of the vertical pulley and crank arm in one direction.

4. In a stabilizing device of the class described, a bracket adapted to be mounted upon the body of a vehicle, said bracket being provided at one end with a depending flange having its lower edge grooved, a horizontally disposed frame pivotally connected at its inner end to said bracket, and extending outwardly beyond the same, a shaft journaled for rotation upon the frame at the outer end thereof, a vertically disposed pulley connected to one end of said shaft, a crank arm also connected to one end, said pulley and crank arm being in substantial longitudinal alignment in said grooved flange, a sectional cable, the outer ends of the sections of which are connected to said grooved flange and crank arm respectively, spring means connecting the inner ends of the sections together for rotating the pulley and crank arm in one direction, and means adapted to be connected with the axle of the vehicle for rotating the pulley and crank arm in the opposite direction.

In testimony whereof I affix my signature.

LAWRENCE P. CROSS.